(12) United States Patent
Solhjell

(10) Patent No.: US 7,123,444 B1
(45) Date of Patent: Oct. 17, 2006

(54) TAPE CASSETTE HAVING AN OPTICAL SIGNAL RECEIVER AND A MEMORY FOR STORING INFORMATION OPTICALLY TRANSMITTED INTO THE CASSETTE

(75) Inventor: Erik Solhjell, Oslo (NO)

(73) Assignee: Tanberg Data ASA, Oslo (NO)

( * ) Notice: Subject to any disclaimer, the term of this patent is extended or adjusted under 35 U.S.C. 154(b) by 0 days.

(21) Appl. No.: 09/083,112

(22) Filed: May 22, 1998

(51) Int. Cl.
*G11B 23/02* (2006.01)

(52) U.S. Cl. .......................... 360/132; 360/69
(58) Field of Classification Search ............... 360/69, 360/132, 60, 137, 71
See application file for complete search history.

(56) References Cited

U.S. PATENT DOCUMENTS

| | | | |
|---|---|---|---|
| 4,338,644 A | 7/1982 | Staar | 360/132 |
| 4,593,337 A | 6/1986 | Leone et al. | 360/137 |
| 4,806,958 A * | 2/1989 | Momot et al. | 354/21 |
| 5,023,741 A | 6/1991 | Conti et al. | 360/132 |
| 5,029,034 A | 7/1991 | Weiley | 360/132 |
| 5,318,370 A | 6/1994 | Nehowig | 400/613 |
| 5,455,409 A | 10/1995 | Smith et al. | 235/385 |
| 5,511,891 A | 4/1996 | Nehowig et al. | 400/583 |
| 5,521,802 A | 5/1996 | Edington | 362/155 |
| 5,638,228 A | 6/1997 | Thomas | 360/60 |

FOREIGN PATENT DOCUMENTS

| | | |
|---|---|---|
| EP | 0 395 723 | 11/1990 |
| EP | 0 396 607 | 11/1990 |
| EP | 0 476 445 | 3/1992 |
| EP | 0 572 953 | 12/1993 |
| EP | 0 583 904 | 2/1994 |
| EP | 0 594 450 | 4/1994 |
| EP | 0 597 726 | 5/1994 |
| EP | 0 603 808 | 6/1994 |
| EP | 0 605 886 | 7/1994 |
| EP | 0 609 290 | 8/1994 |
| EP | 0 616 325 | 9/1994 |
| EP | 0 621 593 | 10/1994 |
| EP | 0 622 794 | 11/1994 |
| EP | 0 640 972 | 3/1995 |
| EP | 0 646 914 | 4/1995 |
| EP | 0 646 922 | 4/1995 |
| EP | 0 760 511 | 3/1997 |
| WO | WO 89/10615 | 11/1989 |
| WO | WO 91/02355 | 2/1991 |
| WO | WO 93/00680 | 1/1993 |
| WO | WO 93/14501 | 7/1993 |
| WO | WO 93/16475 | 8/1993 |
| WO | WO 94/02912 | 2/1994 |
| WO | WO 97/29484 | 8/1997 |
| WO | WO 97/45837 | 12/1997 |

OTHER PUBLICATIONS

Abstract for PCT Application WO 97/02566, Jan. 23, 1997.

* cited by examiner

Primary Examiner—Andrew L. Sniezek
(74) Attorney, Agent, or Firm—Schiff Hardin & Waite

(57) ABSTRACT

A tape cassette has a housing which contains at least one magnetic tape wound on a tape hub, and a semiconductor memory which contains memory data. The tape cassette also includes at least an optical transmitter, and a circuit which has access to the memory contents and which can read out the memory contents from the memory and embody the memory contents in an optical signal, which is transmitted out of the housing by the optical transmitter. The memory data may characterize data stored on the magnetic tape. The cassette can include a further memory which contains data uniquely identifying the cassette, and this data can also be read out and embodied in optical signals which are transmitted out of the housing. A number of such cassettes can be employed in a cassette library system, having a reader which receives the optical signals and which controls a robotic cassette selector by matching either the memory data or the cassette identification data embodied in the received optical signals to data entered into the reader identifying wanted data or a wanted cassette.

12 Claims, 5 Drawing Sheets

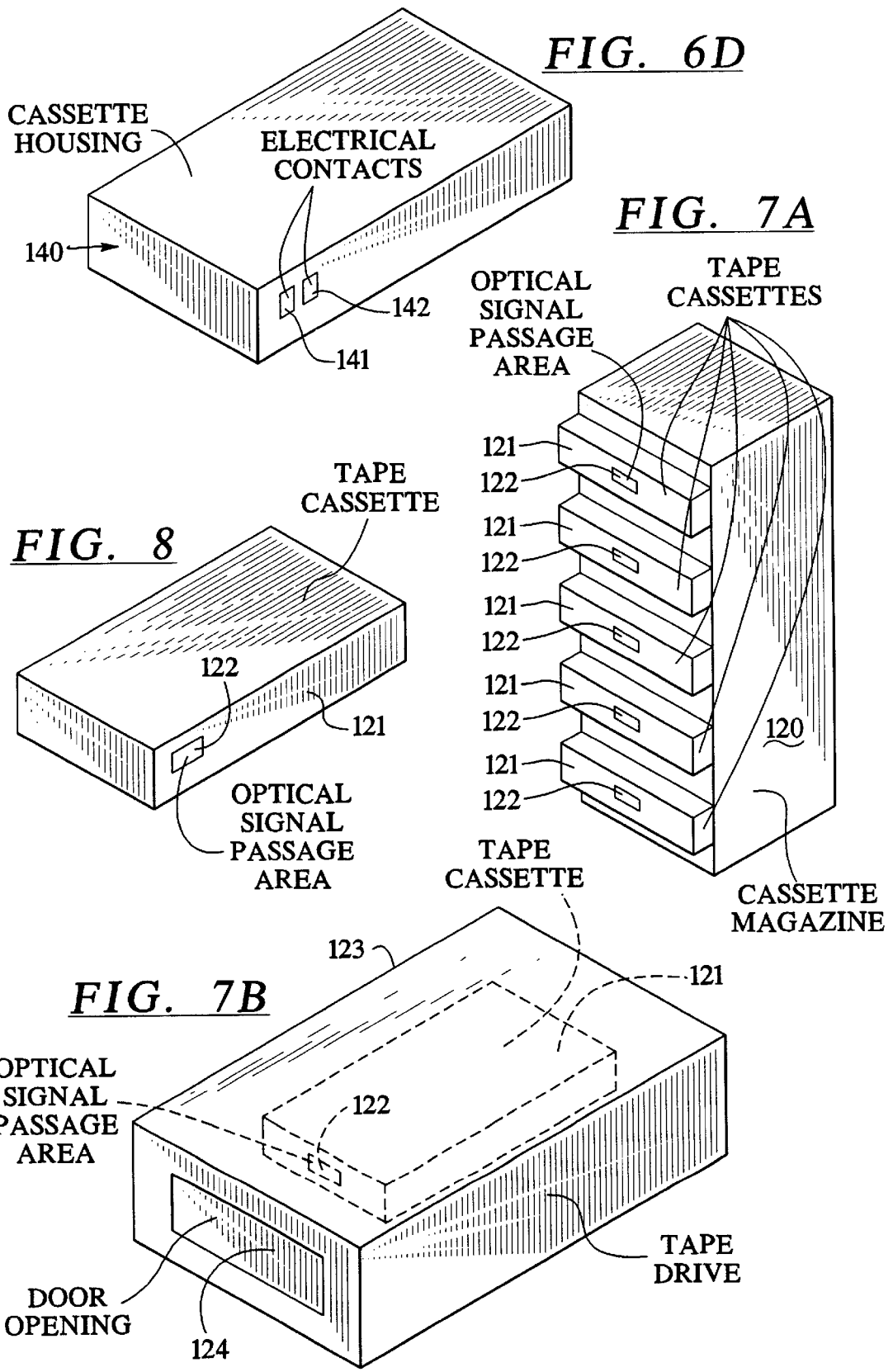

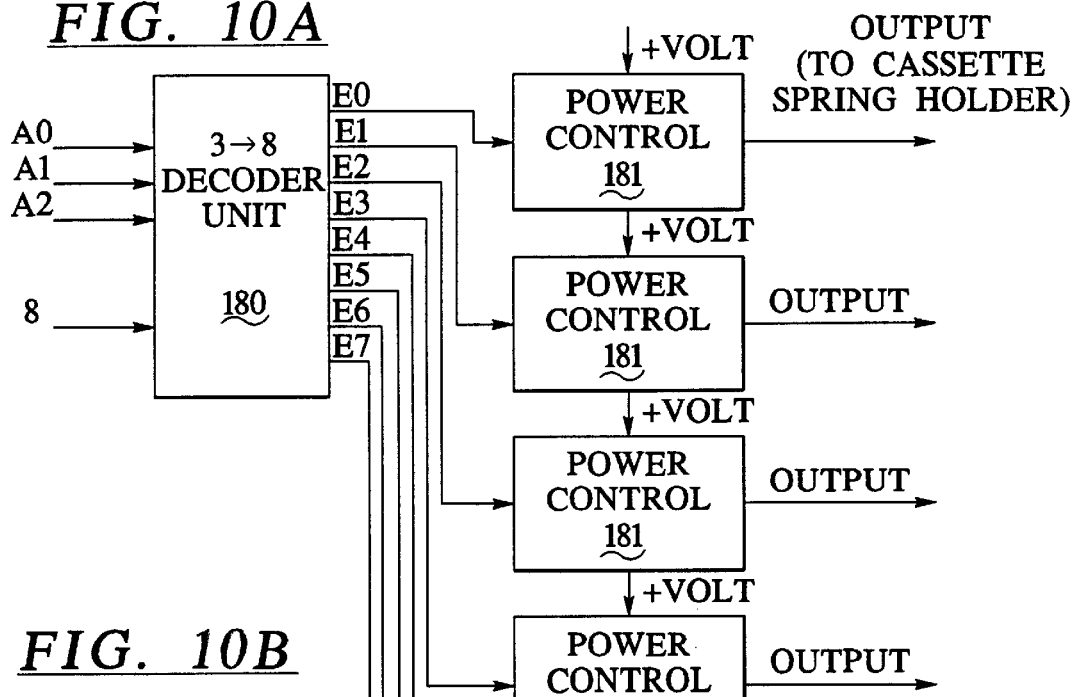
FIG. 10A
FIG. 10B
| A0 | X | 0 | 1 | 0 | 1 | 0 | 1 | 0 | 1 |
|----|---|---|---|---|---|---|---|---|---|
| A1 | X | 0 | 0 | 1 | 1 | 0 | 0 | 1 | 1 |
| A2 | X | 0 | 0 | 0 | 0 | 1 | 1 | 1 | 1 |
| B  | 1 | 0 | 0 |   |   |   |   |   |   |
| E0 | 1 | 1 | 0 |   |   |   |   |   |   |
| E1 | 1 | 0 | 1 |   |   |   |   |   |   |
| E2 | 1 | 0 | 0 | 1 |   |   |   |   |   |
| E3 | 1 | 0 | 0 |   | 1 |   |   |   |   |
| E4 | 1 | 0 | 0 |   |   | 1 |   |   |   |
| E5 | 1 | 0 | 0 |   |   |   | 1 |   |   |
| E6 | 1 | 0 | 0 |   |   |   |   | 1 |   |
| E7 | 1 | 0 | 0 |   |   |   |   |   | 1 |
TABLE
1=HIGH
0=LOW
X=DON'T CARE
FIG. 9
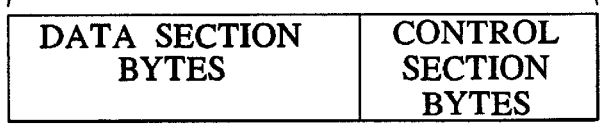
LOGICAL LAYOUT OF
NON-VOLATILE MEMORY
STRUCTURE

TAPE CASSETTE HAVING AN OPTICAL SIGNAL RECEIVER AND A MEMORY FOR STORING INFORMATION OPTICALLY TRANSMITTED INTO THE CASSETTE

BACKGROUND OF THE INVENTION

1. Field of the Invention

The present invention is directed to a tape cassette of the type containing a memory with data stored therein identifying characteristics of the cassette, the cassette being employed in a multi-cassette loader or library system, with the system communicating with the tape cassette to read and write information into and from the cassette memory.

2. Description of the Prior Art

Many types of tape cassettes or cartridges are currently in use, however, such cassettes or cartridges can generally be categorized into three basic groups, these being the single reel cassette, the dual reel cassette, and the belt-driven cassette or cartridge.

Regardless of the type of tape cassette or cartridge being used, the tape drive and its connected computer system will organize the data on the tape in a defined manner, so that it can be read back at a later date even on another (compatible) system. Typically, such a format organization includes some form of file structure (where related groups of data is organized in the same file or group of file names.). Older systems typically divide the various file groups by inserting special marker blocks (often named tape marks or file marks) between the file groups. Later, if a system knows that it wants the contents after a certain file mark, it can instruct the tape drive to quickly locate this particular file mark, and then read from there. This is one way to avoid having to read the tape sequentially to find the wanted data.

Some modern tape systems go one step further by recording information about the file structure (name, contents and location on the tape) in a special section at the front end (beginning) of the tape. Therefore, the tape drive need only read this section to obtain information about the actual contents of the inserted tape. When this section is read, the tape drive can afterwards easily be instructed to go directly to a particular place on the tape and start reading (and maybe writing) from that point. This reduces the effective time to data and make the system operate more effectively.

For single stand-alone tape drives (drives not used in any form of library or loader systems or other kind of large information systems), having key information about the tape contents recorded at the beginning of each particular tape, is quite adequate for normal operation. Automated systems, where the tape drive (or tape drives) are used together with a robotic system which automatically can load or unload cartridges from one or more magazines and insert to or extract these cartridges from the tape drives, demand even more effective ways of handling information about the contents of each of the tape. Also, it is to be expected that even single stand-alone tape drives in the future will need to be smarter and more quickly read the contents of any inserted tape cassette.

FIG. 1 shows a simplified drawing of a conventional robotic system having a tape drive 100, a magazine 101 typically containing from 5 to 10 cartridges or cassettes 102 and a robot 103 which by command can pick a particular cartridge from the magazine and insert it into the drive or vice versa. An electronic controller unit 104 controls the operation of the robot. It get its information partly from the drive, partly from the robot and partly from the host system computer through a connected data and information bus 105. This bus 105, in addition to carrying the information and commands for the control of the robot, also contains data to either be recorded on the tape or extracted from the tape and sent to the computer.

By command from the host computer, the robotic arm can pick up any one of the cassettes 102 and insert it into the tape drive 100. When the drive 100 has finished the read/write operations on the selected cassette 102 it will inform the electronic robot controller 104 which in turn will remove the cassette 102 from the drive 108 and insert it into an empty slot in the magazine 101. The host system will then instruct the robot to pick another cassette, etc.

In its most primitive form, a loader like the one shown in FIG. 1 will need to load a cassette and read at least the beginning of the tape to let the host find out whether it contains the wanted data. If it is not the correct one, the host must instruct the system to try the next cartridge and so on. Sometimes, if the cassette contains little or no data information recorded at the beginning of the tape, it may be necessary to read at least several sections of the tape to determine whether this contains the wanted data. This is a very time consuming and ineffective method.

To at least reduce this pick and try method, many systems now have built-in bar code readers. By having a unique bar code on each cassette, the host can instruct the robot to read the cassette bar codes until it comes to the wanted cassette. In this way, it is no longer necessary to load and read a cassette to determine its contents.

The robotic system of FIG. 1 is a very primitive low end automatic system, normally called a "loader". Such a loader is very often used as the first step in automating a tape drive system. Together with suitable host software, the user can set up the loader and the host to do automatic backup (for example during the night), without the need for any manual support. If the storage capacity on each cassette or cartridge is large enough, it can have a full day's backup on one cassette. In this case, the system can do automatic backup for a whole week without any user support. Furthermore, if the system contains for example, 10 cassettes, it can even have a few spare cassettes in case something goes wrong with a cassette. One slot can also have a cleaning cassette for automatic cleaning operation when so required.

Loaders like that shown in FIG. 1 are becoming increasingly common as a low cost way to automate tape handling and backup. Larger systems, however, typically require better and more advanced tape automation. Such systems are normally called "libraries", and are offered in many different forms. All libraries, however, contain at least two tape drives (many contain four or more drives) and various forms of magazines with cartridges/cassettes. Typically, a magazine may contain between 10 and 100 cassettes, and a library may have from one up to large numbers of magazines. All libraries also have one or more robots (robotic cassette pickers) which can pick any cassette from any of the magazines in the library and place it in any of the tape drives in the library. FIG. 2 shows a simplified block diagram of a library system having four drives 110, two magazines 111 with 10 cassettes 112, a robot cassette handler 113 controlled by an electronic controller unit 114. The commands to the electronic unit 114 come either from the host via a control bus 115 (very often combined so that it also carries data) or from the drives 110 or from the robot system 113 itself. For example, if the library is equipped with a bar code reader, such a reader is typically placed on the robot and the bar code information is fed to the electronic controller unit 114 and from there normally back to the host computer via the bus 115.

The operation of such a library is very much the same as for the loader described in FIG. 1, except that with more tape drives, the system can operate on more than one drive at a time. For example, one drive can wind or rewind the tape in one cassette, while another drive either read or write data from or to another cassette. Some systems can even read or write on more than one tape drive simultaneously. Therefore, a library system is more effective and can handle more data faster than a simple loader system.

Some library systems are also designed so they can be interconnected with other library system in such a way that cassettes/cartridges can be fed from a magazine in one library to a magazine in another library. In this way, very large and sophisticated library systems can be built using small standard libraries as "building blocks".

As the size and complexity of a library system increases, so increases the need to operate the system more and more effectively. The use of unique bar codes on each cassette/cartridge has already been mentioned; likewise the use of a section of the tape (normally at the beginning) where information about the contents of the particular tape is recorded (and kept updated as new information is recorded to or withdrawn from the cassette).

As the demand for higher performance and higher efficiency constantly increases, more advanced methods are introduced to provide the host with detailed information about the contents of each particular cartridge as effectively and quickly as possible.

One method is to equip the library with its own memory containing information about the current contents of every cartridge/cassette in the library. Such a memory can be in the form of a (typically non-volatile) semiconductor memory like a flash memory or a D-RAM or S-RAM memory with battery backup, or it can be in the form of a hard disk. For larger libraries, such special built-in memory systems can be very cost effective, and increase the throughput (time to wanted data) considerably, however, such a special memory system also increases the complexity and cost of the library and its operating software. Also, whenever a magazine with cartridges is removed or inserted, the library memory system needs to go through a special update routine to learn the contents of the cassettes in the new magazine and remove the information about the contents in the old magazine. If several libraries are linked together, this special memory system must be updated every time a cassette is transferred from one library to the next one.

Another method fairly recently used is to equip each cassette or cartridge with its own non-volatile memory (typically, flash memory). This principle is shown in FIG. 3. A memory chip 120 resides inside the cassette housing 121. The electrical control signals needed to write data into the memory chip or read data out of the chip, are supplied to the memory chip 120 via a set of electrical contacts 122 situated at the exterior of one side of the cassette housing. When inserted in a suitable tape drive, spring loaded electrical conducting fingers connect to the electrical contacts 122 so that the drive can write data to the chip 120 or read data from the chip 120.

This method makes it possible to store a fairly large amount of information about the contents of a cassette in the memory chip of the same cassette. When the cassette has been loaded into a drive, the drive can immediately read out the information without the need to begin running the tape to get information about the contents. Therefore, immediately after insertion, the drive can transfer information about the tape contents to the host. Compared with systems required to read special recorded information at the beginning of the tape, this system is much more effective. If the selected cassette does not contain the wanted information, the host can immediately instruct the robot and drive to remove the cassette and pick another one.

This method is also very suitable when new data has been recorded to the tape, because the memory chip 120 can be updated in a very short time (normally less than 1 second) without the need to rewind the tape to the beginning and start recording cassette information at the beginning of the tape. Likewise, when either a single cassette or a whole magazine is removed or inserted from the library, the information about each cassette is always updated without having to go through a special update sequence (as is needed when the library contains for example a hard disk memory system).

While the approach illustrated in FIG. 3 significantly improves the performance of both a single drive system and a loader/library systems, it still requires the cassette to be inserted into the drive to read the contents of the built-in memory chip. It is of course possible to construct magazines where each cassette slots contains the necessary spring loaded contacts making connections to the memory chip inside each cassette. Typically, at least 5 to 7 contacts are required per cassette: two contacts for power connections, one serial data signal, one write enable signal and one read enable signal. Extra signals may be used to select special sections of the memory chip 120 etc.

Therefore, although technically quite feasible, building magazines with such connections for every cassette and the related control electronics to read or write data selectively to or from a cassette, increases complexity and cost of such a system quite significantly.

A method which has been proposed to overcome this, is to replace the connector system with a form of radio transmission system. Each cassette then contains a small radio transmitter and receiver. The idea is that each cassette can be selectively turned on by a coded radio signal sent out by a transmitter built into the library and will then transmit the contents of its memory chip to a receiver also situated in the library (or allowing new data to be written into the chip if so required). The power to the chip itself and the receiver/transmitter electronics inside each cassette has been proposed to come from the transmitted radio signal from the library. In each cassette, a small transformer picks up the transmitted radio signal from the library, rectifies it and uses this resulting DC power to power the built-in electronics in the cassette.

Therefore, this system appears to have promise as an ideal system for sophisticated libraries: The cassette magazines need not be modified at all. Into each library is built a transmitter and a receiver. The transmitter serves two purposes. Its transmitted signal is picked up by the small transformer in each cassette, rectified and used to power the electronics in each cassette. The transmitted signal also contains coded information about which particular cassette the library system wants to address. The selected cassette turns on its transmitter, and transmit the data. The information is picked up by the receiver in the library and can then be sent back to the host.

There are some significant drawbacks. First, having any sort of transmitter close to magnetic data represents a risk of destroying or at least weakening the recorded data on the tape. Therefore, the transmitted signals need to be very weak so as not to disturb the recorded signals.

Second, although the transmitter/receiver inside each cassette can probably be built with one integrated circuit and a few discrete components, it is still a fairly complex and expensive piece of electronics. For libraries having a large number of cassette, the cost of each cassette is very important.

A third drawback is the problem of interference with other transmitted (radio) signals in the environment of the library. This could come from the use of mobile phones, TVs, radios, power supplies etc. Therefore, to ensure proper operation, such libraries need to be well protected against electrical interference.

SUMMARY OF THE INVENTION

An object of the present invention is to provide a method and apparatus which allow for very simple read out of cassette data in a tape drive or a library without the problems mentioned above.

This object is achieved in accordance with the invention by equipping a cassette having a non-volatile memory with an optical transmission reception capability to read out data from the memory or to write data to the memory. Circuits and designs similar to those used in handheld remote controllers for VCRs, TVs etc. can be used to keep the cost low.

The inventive tape cassette or cartridge has a housing which, in addition to the conventional tape hub or hubs and the tape itself contains an electronic control circuit which controls the operation of a non-volatile memory chip in the housing, and also provides special control functions. The electronic control circuit contains or is connected to a transmitter circuit which is in turn connected to one or more light-emitting diodes so as to allow for optical transmission of information from the memory chip to an exterior location. The electronic control circuit is also connected to a receiver circuit which is in turn connected to an optical sensor, for receiving incoming optical signals for writing information into the memory chip.

The electronic control unit also contains a cassette information memory, which contains a digital address which is unique to the cassette, and which may contain other unique cassette information, such as the date of manufacture, the name of the manufacturer, the cassette type, the tape (media) type and/or the tape length.

The optical sensor and the light-emitting diode or diodes are placed within the cassette housing so that they can easily receive and transmit data through the cassette housing to another component of a library system in which the cassette is employed. This other component may, for example, be a drive in which the cassette is contained, or a host computer of the library.

The cassette can be provided with electrical contacts so that, when it is placed in an inventive magazine, it can be continuously powered so that the electronic control circuit therein is always "listening" for an interrogation of the cassette by the library. When a robot or other library component is in the process of selecting an appropriate cassette containing particular data, the robot can interrogate all cassettes within a magazine, or within a number of different magazines, in order to identify the cassette having the appropriate number or address associated with the wanted data. When a match between the desired address and the cassette address is found, the cassette transmits an appropriate signal, so that the robot is then directed to remove that cassette from the magazine and place it in a drive.

For supplying power to the cassette, it can be provided with two electrical contacts which respectively mate with flexible contacts in a receptacle in a cassette magazine. Each cassette slot in the magazine contains such contacts, so that all cassettes in the magazine can be continuously supplied with power, so that all of the cassettes are always "listening" for an interrogation.

The magazine is designed so that, under certain circumstances, each cassette may be individually supplied with power, rather than all cassettes being supplied with power in common. This can be useful if the library system does not "know" in advance the number or address of the cassette which contains the desired information. Sending out a signal from the library to all of the cassettes, asking them to transmit their address information, would result in all of the cassettes simultaneously transmitting signals back to the library. By having the capability of individually supplying power to only one cassette at a time, this allows an "unaddressed" signal to be transmitted from the library, but only the cassette which is currently receiving power will respond thereto. The "unaddressed" transmission contains an identification of the wanted data, and as the cassettes in the magazine are successively individually supplied with power, finally a match will occur between the data described in the transmitted signal and the data description stored in the memory of one of the cassettes, and this cassette will then respond to the library with an answer back signal.

DESCRIPTION OF THE DRAWINGS

FIGS. 6A, 6B, 6C and 6D respectively illustrate different embodiments for electrical contact configurations for supplying power to the cassette of FIG. 1, in accordance with the invention.

FIG. 7A illustrates a number of cassettes constructed in accordance with the principles of the present invention, in a magazine of a library system having the capability of optically communicating with the individual cassettes.

FIG. 7B shows a cassette constructed in accordance with the principles of the present invention contained in a tape drive or streamer.

FIG. 8 shows a cassette constructed in accordance with the principles of the present invention, with an alternative location of the area of the cassette housing through which optical signals pass.

FIG. 9 schematically illustrates the format of the non-volatile memory in the cassette of the invention.

FIG. 10A is a block diagram of a library system allowing selective supply of power for each cassette in a library magazine.

FIG. 10B is a table for explaining the operation of the system shown in FIG. 10.

DESCRIPTION OF THE PREFERRED EMBODIMENTS

Figure 1:
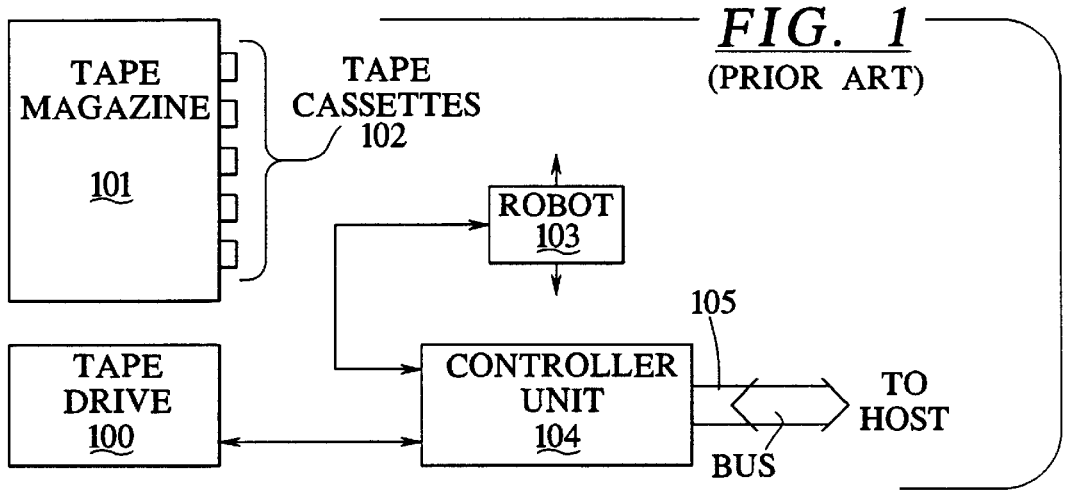
FIG. 1, as described above, is a block diagram showing the basic components of a conventional robotic cassette loader system.
Figure 2:
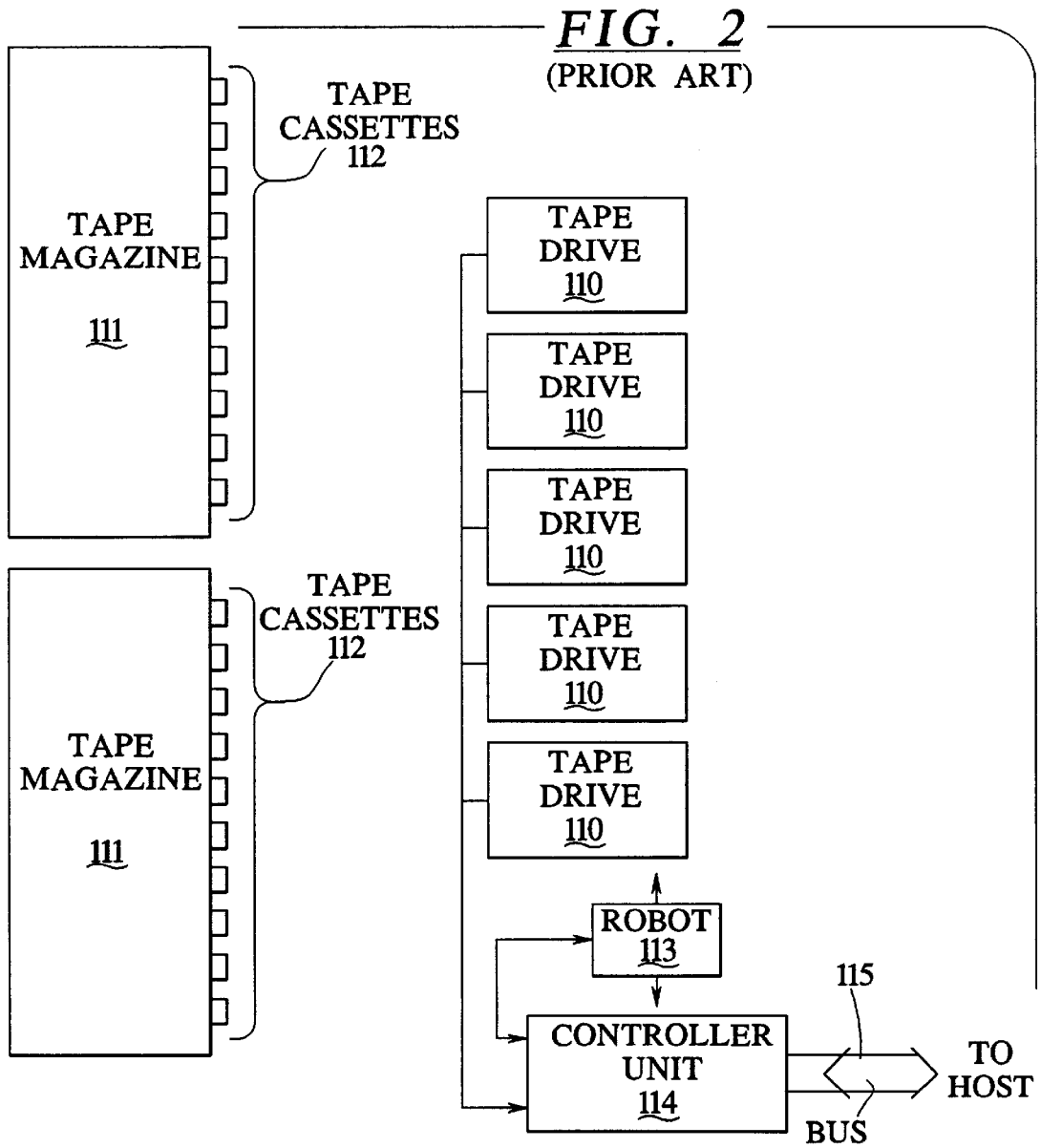
FIG. 2, as described above, is a block diagram showing the basic components of a conventional robotic cassette library system.
Figure 3:
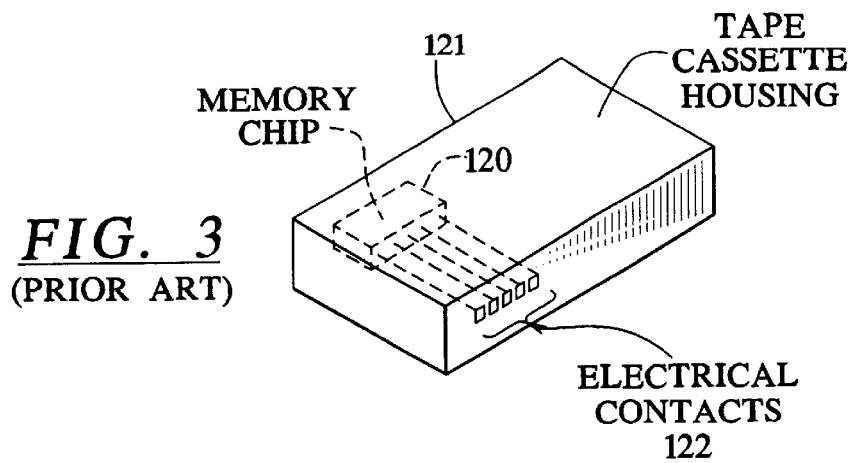
FIG. 3, as described above, illustrates a known tape cassette equipped with a non-volatile memory, and contacts for entering data into and reading data from the memory.
Figure 4:
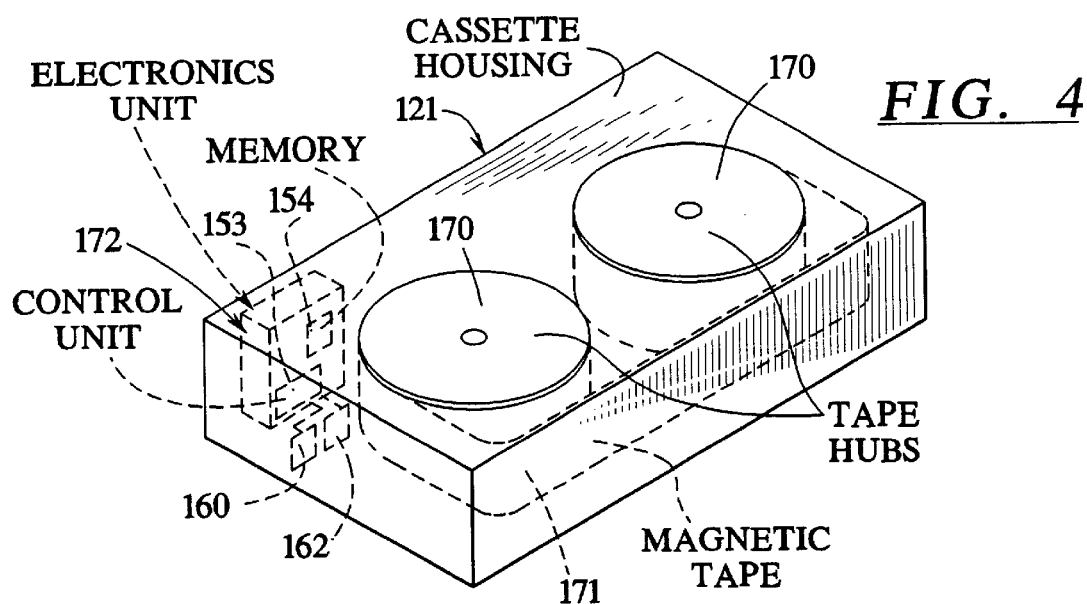
FIG. 4 illustrates a cassette constructed in accordance with the principles of the present invention, with the capability of optical data exchange with a component remote from the cassette.
Figure 5:
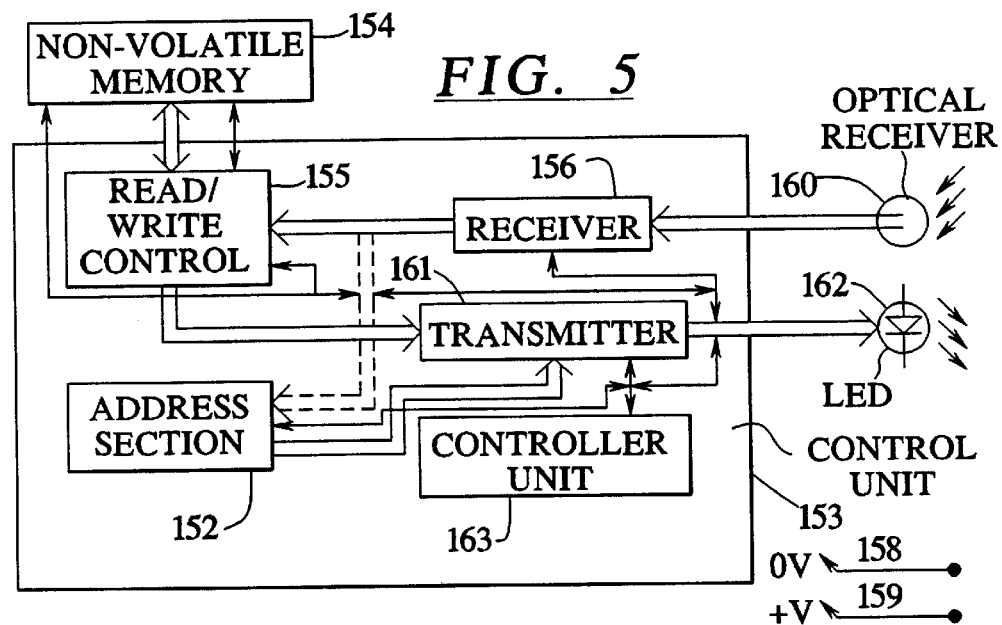
FIG. 5 is a block diagram showing details of an embodiment of the electronic control unit in the cassette of FIG. 4, in accordance with the principles of the present invention.

The basic components of a cassette constructed in accordance with the principles of the present invention are shown in FIG. 4. The cassette has a housing 121 which contains one or more rotatable hubs 170, on which a magnetic tape 171 is wound. Data can be written onto and read from the magnetic tape 171 in a known manner. The structure of the housing 121 allowing for a read/write head to be brought into contact with the magnetic tape 171 can be of any form well-known to those of ordinary skill in the art, and is therefore not depicted in FIG. 4. The housing 121 also contains an electronics unit 172 which, as explained in more detail in connection with FIG. 5, is connected to an optical sensor 160 and an optical transmitter 161. The housing 121 can either be completely optically transparent, or can have sections thereof which are optically transparent, as described in more detail below, so as to allow optical signals to proceed to and from the optical sensor 160 and the optical transmitter 162.

As shown in more detail in FIG. 5, the electronics unit 172 contains an electronic control unit 153 which controls the operation of a non-volatile memory chip 154 and provides special control functions described later. The electronic control unit 153 contains an electronic read/write section 155 to either write data into the chip 154 or read it out of the chip 154. Furthermore unit 153 also contains a receiver circuit 156 which can receive and decode optically coded signals received by an optical sensor 160. The optical sensor 160 can be in the form of an optically sensitive transistor or another optically designed sensitive receive unit. The electronic control unit 153 also contains a transmitter circuit 161 connected to one or more LEDs 162. Information in the form of coded visible or non-visible light can be received by the optical sensor 160 and sent to the receiver section 156. This receiver section 156 will decode the signal as described below.

The electronic control unit 153 also contains a cassette information memory 157 which contains a digital unique address or number for each cassette. Furthermore, this memory 157 can contain other unique cassette information, such as date of manufacture, manufacturer's name, cassette type, tape (media) type and tape length.

This unique address and cassette information contained in the memory 157 will normally be permanently programmed all during the manufacturing of the cassette.

Inside the electronic control unit 153 is a controller 163 (typically a microprocessor or a hardwired controller unit) which controls the total operation of the system. Control lines are connected to the various circuits inside the electronic control unit 153 and also to the non-volatile memory 154.

Although the system described by the block diagram in FIG. 5 may be built using separate components readily available on the market, cost, space requirements and power requirements will normally indicate that a large number (or all) of the components shown in FIG. 5 is integrated on one special ASIC.

To power the electronic control unit 153 and the connected components inside the cassette, two power connectors 158 and 159 (for 0 volt and +volts) are mounted on the cassette housing. These two connectors are described in more detail below.

The optical sensor 160 and the LED 162 are placed so that they can easily receive and transmit data through the cassette housing to the outside drive or library. The cassette housing must therefore be made in such a way that the optical signal can easily pass through (both ways).

The operation of the system is as follows:

If the cassette has been inserted in a suitable tape drive, connectors in the drive supply power to the electronic control unit 153 through the two power connectors 158 and 159. If the drive transmits a suitable optical signal, it can be received by the optical sensor 160 and the receiver circuit 156.

The optical signal will contain several information section or groups (blocks) of information data. One such group will contain the wanted cassette address (if the drive knows which cassette it wants). In this case the control unit 153 will compare the wanted address number with its own contained in the memory 157. If there is a match, the electronic unit 153 will accept the command signal and react according to the other command or commands transmitted. If it is not a match, the cassette will just continue to "listen" or wait for new signal commands.

Once there is a match, the drive may either ask for data to be transmitted from the cassette's non-volatile memory 154 (or from the address/cassette information section 157) to the drive or vice versa. In the first case, data is read out from the memory 154 (or 157) by the electronic read/write unit 155, sent to the transmitter 161 where it is properly coded and conditioned and is then sent to the LED 162 where it is transformed into an optical signal stream. This signal is then received by an optical receiving unit located in the drive.

If data are to be written into the cassette's non-volatile memory, such data are sent by the optical transmitter system in the drive and received by the optical sensor unit 160 in the cassette. Then the signal passes to the receiver section 156 which decodes the data stream. The decoded data to be recorded is then written into the non-volatile memory 154 by the electronic read/write unit 155.

It is possible for the drive to send a special command to the cassette asking for information about its unique cassette address and other cassette information (contained in the memory 157).

In terms of components (but not purpose) this system in principle is similar to those typically used in the receiver/transmitter system of a VCR or TV and its corresponding handheld remote control unit, and thus components for building such a system are very cheap. Normally, everything may be integrated into one or two chips with possibly only the LED 162 and/or the optical receiver 156 outside as separate (discrete) components.

If the cassette is inserted in a library magazine, the operation to read out data (seldom to write data in this case) will in principle be the same as when inserted in a tape drive. Power is supplied by two connectors in the magazine for each cassette. The cassette must be inserted so that the optical signal can pass between the cassette and the optical read/write unit in the library. This is discussed in more detail below.

Power can either be selectively applied to each individual cassette, to all the cassettes in a magazine or to all magazines and cassettes in a whole library. Each of the powered cassettes will "listen" for the coded optical signal and look for its own unique cassette address. Every time a cassette detects its address it will execute according to the corresponding transmitted command (typically a read data command) and if so transmit the required data from its non-volatile memory as an optical signal stream to the receiver system located in the library. Since each cassette has a unique address, all cassettes can be powered continuously without fear of interference. Only the cassette being actually addressed will respond by sending data back to the library receiver. Furthermore, except for the cassette actually transmitting data, the power consumption for the other cassettes will typically be very low.

There may be a case, however, where the system does not "know" the actual cassette number. Sending a command asking the cassette to transmit information about its address will result in all the contained cassettes reacting to this command at the same time and transmitting the address information more or less simultaneously. This will result in signal chaos, and the library system will not be able to detect any valid information.

Therefore, for use in a library system, it is desirable to design the magazines so that each cassette may be powered separately if so required. This will make it possible for the library system to individually address each cassette and ask for its address number and other vital cassette data. Furthermore, this will also provide the library with information where each cassette is physically located (both for the magazine, if there is more than one magazine in the library, and also within each magazine). This again will allow the robot control system of the library to move the robot picking the cassettes more effectively and faster, since it knows precisely where each cassette is located.

FIG. 10A shows the basic principle for such a system allowing both selective (individual) powering for each cassette in a magazine containing (as an example) eight cassettes and for all the cassettes simultaneously. The base (0 volt) power signal is applied to all cassettes at all times. The three address lines A0, A1 and A2 from the library controller unit are decoded by a digital 3 to 8 decoder unit 180. A decoder override line B is also fed to the decoder unit 180. Depending upon the value of the three address lines A0, A1 and A2 and providing the override line B is low, one of the eight output lines E0 though E7 will be high and all the other ones will be low. The actual decoding is shown in the table in FIG. 10B. If the override line B is set high, all the eight output lines E0 through E7 go to a high value, regardless of the value of the three address lines A0, A1 and A2.

Each of the enable lines E0 through E7 is fed to a power control circuit 181 (essentially a power gate). For each one of these controllers, the output will be low as long as the corresponding input enable signal is low. When the input signal is high, the output goes to a high value (=+voltage power) and this is fed to the corresponding power feeder for that particular cassette position within the magazine. Therefore, by using the four control signals A0 through A2 and B, the library unit can selectively power all cassettes in the magazine or just a single individual cassette. For larger magazines or where several magazines are used in the same library, this selection control system can be increased by more control lines.

Since the only two physical connectors needed for each cassette are the power connectors, and since these two connectors carry electrical power and not just very low level electrical signals, these two power connectors can be designed cheaply and with more design freedom than typically possible for cassettes having all its data transmission through physical connectors. FIGS. 6A, 6B, 6C and 6D illustrate some examples.

Figure 6A:
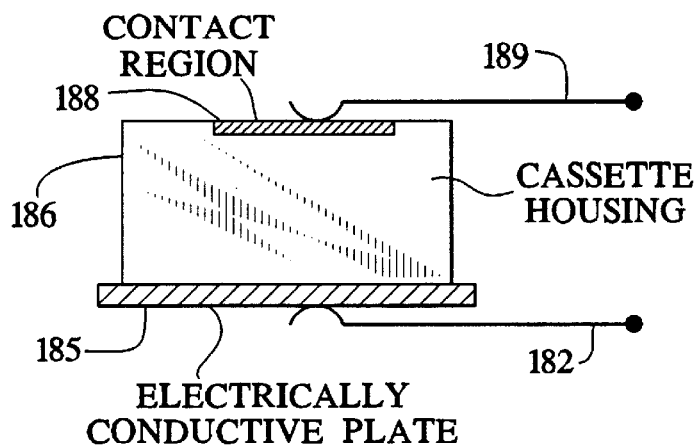

FIG. 6A shows a cassette having a cassette housing 186 having a metal base plate 185. The drawing shows the cassette housing as seen from the side. In this case, the base plate 185 is used as one of the two power contacts. A gliding "finger spring" 187 in the drive or the magazine makes the necessary contact to the base plate 185. This may, for example, be the ground connection. From the base plate 185, a connection is made to the provide power to the electronic circuit inside the cassette.

The other power connection is made to the top of the base plate, where a metal plate 188 is inserted. Another gliding "finger spring" 189 makes contact to this metal connector 188 and this may then, for example, be the positive voltage power connection.

Since there is only one connector on the top and one on the bottom of the cartridge, the position of the metal connector 188 and base plate 185 with respect to the fingers 187 and 189 is not very critical. Also, one or both of these fingers may be used to keep the cassette in place in a magazine (or in the drive), thereby serving two purposes at the same time.

The metal connector 188 on the top cover of the cassette housing 186 in FIG. 6A may be replaced by an area of conductive material or coating provided a suitable connection can be made between the spring finger 189 and the conductive area and between this area and the electronic control unit 153 inside the cassette.

Figure 6B:
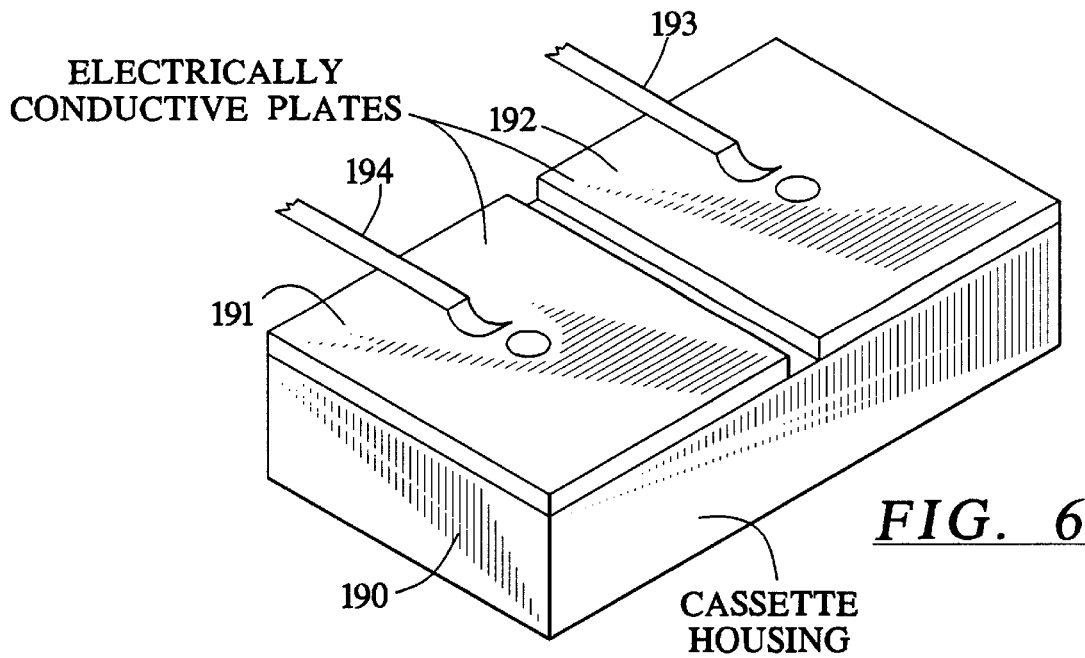

FIG. 6B shows another variant wherein the base plate is formed of two metal plates 191 and 192 (or other suitable conductive material). FIG. 6B shows the cassette from the bottom. Both plates 191 and 192 are contacted by spring fingers 194 and 193 in the drive and/or magazine, one finger at 0 volts power, the other at positive voltage power. The cassette housing 190 is made of a non-conductive material and keeps the two base plate elements 191 and 192 in place. Inside, the two base plates 191 and 192 are connected to the power connections for the electronic control unit 153.

Figure 6C:
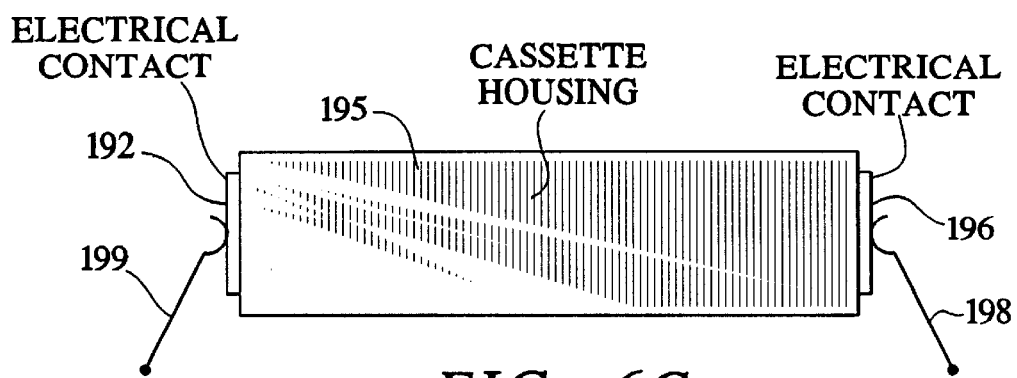

Another variant shown in FIG. 6C, has two metal plates or conductive areas 196 and 197 on two sides (preferably two parallel sides) of the cassette housing 195. Power is applied through two fingers 198 and 199 in the drive and/or magazine sliding along the metal plates 196 and 197. This design may be especially suitable for cassettes containing just one single tape reel. Such cassettes normally do not require a stiff metal base plate, and it may therefore be easier to have the connection on the sides.

FIG. 6D shows a design where two contacts 141 and 142 on the cassette housing 140 are small metal plates or connectors mounted side by side. (They may be placed either along one of the housing sides, or on the top or bottom of the housing). Springs in the drive and/or magazine again touch these two metal plates or connectors and carry the necessary currents. This design is especially suitable for cassettes having little space available for large area metal plate connectors.

If designed correctly, these spring loaded fingers used to connect electrical power to the cassette may do double duty as physical springs to keep the cassette stable in place, either inside the drive or inside the magazine. Especially for library magazines this may be quite important, as cassette which are not kept in place by some means of springs or equivalent, may physically be thrown out of the magazine when the magazine is moving (rotating) as is the case in many library systems. Therefore, typical magazines are designed with one or more "spring fingers" to keep each cassette in place and prevent that the cartridge accidentally falls out of the magazine during operation. Therefore, properly designed, the additional cost of having such springs to feed power may be negligible compared to a magazine not having this feature. By using fairly large connection areas on the cassette as shown in FIGS. 6A through 6C, the placement of the cassette inside the magazine is far less critical.

The placement of the LED and optical sensor inside the cassette housing is critical in order to ensure the best possible transmission between the cassette and the transmitter/receiver system either when the cassette is loaded inside the tape drive or placed in a magazine in a library. Typically, the best placement is such that the optical signals pass through one of the (transparent) side walls of the cassette. Which side wall to use depends upon the actual cassette/cartridge design, and also the design of the drive itself and the magazines used in the library systems. In general, the side through which the optical signals pass it should be the side wall facing away from the magazine as shown in FIG. 7A. FIG. 7A shows a magazine 120 with five cassettes 121. The shaded area 122 shows were the optical signal passes through. Normally, the whole side edge will be made of material which is transparent to the optical signal transmitted to or from the cassette.

In the tape drive, the LED transmitter and the optical sensor should be placed so that they easily can pick up the signals coming from or going to the cassette. The side wall projecting from a magazine as shown in FIG. 7A may be the same side facing toward the drive cassette opening (sometimes covered by a flexible shield or door ) when the cassette is inserted into a drive as shown in FIG. 7B. FIG. 7B shows the tape drive 123, with the cassette 121 inserted in the tape drive 123 through the door opening 124, with the area 122 where the optical transmission signal (as shown in FIG. 7A) may pass. Although not impossible to have the transmission pass through the side marked as 122, it may sometimes be a more optimal solution to place the transmitter/receiver system closer to the corner and/or along a cassette side which is not parallel with the door opening when inserted in a tape drive. One possibility is shown in FIG. 8 wherein the optical signal transmission 122 is an area on a cassette side not parallel and closest to the drive door when inserted in a drive. The signal transmission may pass through the area 122 which will also project outside the library magazine when the cassette is inserted in a magazine. Therefore, even when inserted in a magazine, the contents of the non-volatile memory may be transmitted to receiver/transmitter circuit placed in the library.

When used in a library system, depending upon the number and physical placement of the cassettes and the magazine(s), it may be necessary to equip the library with several groups of transmitter/receiver components 125 to ensure proper communication with all the cassettes, regardless of its physical position inside the library cabinet.

To fully utilize the flexibility and power of the integrated non-volatile memory system in the cassette, it should be designed to contain not just information about the data and file structure on the tape, but also special information in connection with the security of the data, the actual performance of the cassette etc. Therefore, the data contents stored in the non-volatile memory can be split in two parts as shown in FIG. 9: a control section and a data information section. Not all cassettes or drives need to use all information in the control section, but by enabling such information to be recorded in the non-volatile memory, the performance level of the tape system may be further enhanced.

The actual layout of the contents of the control section and the data section in the non-volatile memory may vary, however, as a minimum the control section should contain data bytes covering the following areas:

1. Information about the date of first recording of data and the number of times being recorded and the numbers of times being actually read (tape movement).
2. Information about error performance of the particular tape, including error rate of last read or write operation and trend indication. This may be used to warn the host of cassettes nearing its end of life point.
3. Special pass word protection which may prevent the cassette from being recorded on (or even read out) unless the correct password is supplied by the drive or host controller.
4. Information about the write protect status of the cassette. A host may transmit information that a cassette shall be write protected (even if the cassette has a mechanical write protect switch which is not in a write protect mode). This will enhance the flexibility and control especially in library systems with little physical user presence.
5. Key code pattern to be used in connection with a possible data encryption for the particular cassette. This will allow data to be recorded in encrypted form and a user reading the data back will not be able to decode the encrypted data unless he/she has the necessary code words which relates to or corresponds to the Key code pattern recorded in the non-volatile memory in the cassette.
6. Special codes being used to control data compression (on/off and methods), recording formats and other recording information.

The data section of the non-volatile memory should contain updated information about the data files recorded on the tape. This will allow a host system to quickly locate the cassette or cassettes containing the wanted data without even having to physically load the cassettes in a tape drive, and it will allow a tape drive to go to the wanted data in the most optimum, fastest way.

Power can of course also be supplied to such an optical cassette system by using contactless inductive power and an integrated small transformer as previously mentioned, however, due to the complexity and cost of such a design and the risk of using magnetic power transmitters close to recorded tape media makes such design far less desirable.

Compared to cassettes with memory having all their connections done through a series of (small) mechanical connectors, the optical data read/write system described here requires a much simpler and less critical mechanical connections; only ground and plus voltage power. While in the first case the connectors may need to be gold plated to ensure proper contacts even at very low signal levels, the optical read/write systems two mechanical contacts can be designed far simpler, more robust and with wider tolerances. Furthermore, as already mentioned, the spring contacts may be designed to do more than one job (both conducting current and keeping the cassette in a correct position) thereby reducing the total system cost even further.

Compared to the cassette with integrated memory chip and using mechanical connectors for all of its operations, the cassette invention described here provides for more effective and less costly utilization of the cassette memory chip, especially when used in libraries as described earlier.

Although modifications and changes may be suggested by those skilled in the art, it is the intention of the inventor to embody within the patent warranted hereon all changes and modifications as reasonably and properly come within the scope of his contribution to the art.

I claim as my invention:

1. A tape cassette comprising:

a housing;

a magnetic tape wound on at least one hub in said housing, said magnetic tape having tape data recorded thereon in a magnetic recording procedure having procedure parameters associated therewith, said tape data representing information and said procedure parameters being necessary to be known for receiving said information;

a semiconductor memory in said housing containing memory data characterizing said tape data;

an optical transmitter in said housing which emits outgoing optical signals;

an optical receiver in said housing which receives incoming optical signals containing data including said procedure parameters;

said housing having at least a region thereof which is transparent to said incoming and outgoing optical signals and said optical transmitter and said optical receiver being disposed in said housing so that said incoming optical signals and said outgoing optical signals pass through said region; and an electronic control circuit in said housing connected between said semiconductor memory and said optical transmitter and said optical receiver, for writing said data contained in said incoming optical signals into said semiconductor memory as at least a portion of said memory data, for reading out said memory data from said semiconductor memory upon a readout request contained in said incoming optical signals, and for embodying memory data read out from said semiconductor memory into said outgoing optical signals.

2. A tape cassette as claimed in claim 1 wherein said semiconductor memory comprises a first semiconductor memory, and said tape cassette further comprising a second semiconductor memory in said housing containing cassette identification data uniquely identifying the tape cassette, and wherein said electronic control circuit comprises means for reading out said cassette identification data from said second semiconductor memory upon a request in said incoming optical signals, and for embodying said cassette identification data in said outgoing optical signals.

3. A tape cassette as claimed in claim 1 comprising a first electrical contact and a second electrical contact accessible from an exterior of said housing, said first electrical contact and said second electrical contact being electrically connected to said electronic control circuit for supplying electrical power to said electronic control circuit.

4. A tape cassette as claimed in claim 3 wherein said housing comprises a housing face composed of electrically conductive material forming said first electrical contact.

5. A tape cassette as claimed in claim 4 wherein said housing face comprises a first housing face, and wherein said housing comprises a second housing face having a region therein composed of electrically conductive material forming said second electrical contact.

6. A tape cassette as claimed in claim 3 wherein said first electrical contact comprises a first part of said housing composed of electrically conductive material and wherein said second electrical contact comprises a second part of said housing composed of electrically conductive material, and wherein said housing has a housing face formed by said first housing part and said second housing part, separated by non-electrically conductive material.

7. A tape cassette as claimed in claim 3 wherein said housing has a plurality of housing faces, and wherein said first electrical contact is disposed on a first of said housing faces and wherein said second electrical contact is disposed on a second of said housing faces.

8. A tape cassette as claimed in claim 3 wherein said housing h as a plurality of housing faces, and wherein both of said first electrical contact and said second electrical contact are disposed on a single one of said housing faces.

9. A tape cassette as claimed in claim 3 wherein said semiconductor memory is connected to said electronic control circuit for receiving power from said first and second electrical contacts via said electronic control circuit.

10. A tape cassette as claimed in claim 3 wherein said semiconductor memory is directly connected to said first and second electrical contacts for receiving power therefrom.

11. A tape cassette as claimed in claim 1 wherein said semiconductor memory comprises a first semiconductor memory and wherein said memory data comprises data characterizing data stored on said magnetic tape, and said tape cassette further comprising a second semiconductor memory containing cassette identification data therein uniquely identifying said tape cassette, and said tape cassette further comprising means in said housing for reading said cassette identification data out of said second semiconductor memory and for embodying said cassette identification data in outgoing optical signals and for transmitting said outgoing optical signals through said housing to the exterior of said housing.

12. A tape cassette as claimed in claim 1 wherein said procedure parameters are selected from the group consisting of a date of first recording of said tape data, a number of times said tape data has been recorded, a number of times said tape data has been read, error performance occurring during said recording procedure, password protection information, write protect status, a key code pattern associated with encryption of said tape data, a code for controlling compression of said data, and recording format identification.

* * * * *